(12) United States Patent
Koch et al.

(10) Patent No.: US 9,889,390 B2
(45) Date of Patent: Feb. 13, 2018

(54) LIQUID-LIQUID EXTRACTION SYSTEM AND PROCESS FOR USE THEREOF

(71) Applicant: Sulzer Chemtech AG, Winterthur (CH)

(72) Inventors: Jörg Koch, Kandern (DE); Juan Ramon Herguijuela, Auggen (DE)

(73) Assignee: Sulzer Chemtech AG, Winterthur (CH)

( * ) Notice: Subject to any disclaimer, the term of this patent is extended or adjusted under 35 U.S.C. 154(b) by 306 days.

(21) Appl. No.: 14/650,926

(22) PCT Filed: Nov. 27, 2013

(86) PCT No.: PCT/EP2013/074881
§ 371 (c)(1),
(2) Date: Jun. 10, 2015

(87) PCT Pub. No.: WO2014/095280
PCT Pub. Date: Jun. 26, 2014

(65) Prior Publication Data
US 2015/0314217 A1 Nov. 5, 2015

(30) Foreign Application Priority Data

Dec. 21, 2012 (EP) ..................................... 12198946

(51) Int. Cl.
*B01D 11/04* (2006.01)
*B01D 21/00* (2006.01)
(Continued)

(52) U.S. Cl.
CPC ........ *B01D 11/043* (2013.01); *B01D 11/0434* (2013.01); *B01D 11/0457* (2013.01);
(Continued)

(58) Field of Classification Search
CPC ... B01D 11/04; B01D 11/0426; B01D 11/043; B01D 11/0434; B01D 11/0446;
(Continued)

(56) References Cited

U.S. PATENT DOCUMENTS

| 1,105,954 A | 8/1914 | Beach |
|---|---|---|
| 2,081,720 A | 5/1937 | Van Dijck |
| (Continued) | | |

FOREIGN PATENT DOCUMENTS

| CN | 101219289 | 7/2008 |
|---|---|---|
| GB | 918107 A | 2/1963 |
| (Continued) | | |

*Primary Examiner* — Joseph Drodge
(74) *Attorney, Agent, or Firm* — Larson & Anderson, LLC (57) ABSTRACT

A liquid-liquid extraction system (1) adapted for the flow of two or more liquids therein is disclosed. The system comprises a mixer settler sub-system (100) and a counter-current liquid-liquid extraction column (200). The sub-system (100) comprises one or more mixer settlers (110) connected in series, and the column (200) comprises either a mixing section (260) comprising an agitation means (261) and/or a static section (280) comprising an internal (281). The first outlet (131) of the mixer settler sub-system (100) is in fluid communication with the first inlet (221) of the column (200) and the second inlet (112) of the mixer settler sub-system (100) is in fluid communication with the second inlet (222) of the counter-current liquid-liquid extraction column (200). The invention further relates to a counter-current liquid-liquid extraction process for using said system 1. The present invention further relates also to the use of the system (5) or process in removing aromatic compounds from organic streams, in treating an oil stream of a refinery, or in a liquid-liquid extraction process having at least two feed streams of different viscosity, similar density, or low interfacial tension.

15 Claims, 6 Drawing Sheets

(51) Int. Cl.
 *B01F 3/08* (2006.01)
 *B01D 21/02* (2006.01)
 *B01D 11/00* (2006.01)

(52) U.S. Cl.
 CPC ...... *B01D 11/0488* (2013.01); *B01D 21/0039* (2013.01); *B01D 21/10* (2013.01); *B01F 3/0873* (2013.01); *B01D 2011/002* (2013.01)

(58) Field of Classification Search
 CPC ............ B01D 11/0449; B01D 11/0453; B01D 11/0457; B01D 11/0473; B01D 11/0488; B01D 21/0039; B01D 21/0042; B01D 21/0045; B01D 21/0048; B01D 21/0087; B01D 21/10; B01D 21/24; B01D 21/2405; B01D 21/2444; B01F 3/0873; C02F 1/26; C02F 2101/30; C02F 2101/32; C02F 2101/325
 USPC .......................... 210/511, 634; 422/256–259
 See application file for complete search history.

(56) References Cited

U.S. PATENT DOCUMENTS

| | | | |
|---|---|---|---|
| 2,091,078 A * | 8/1937 | McKittrick | C10G 21/02 208/317 |
| 2,493,265 A | 1/1950 | Scheibel | |
| 2,601,674 A * | 6/1952 | Reman | B01D 11/043 208/311 |
| 2,665,196 A * | 1/1954 | Poffenberger | B01D 11/043 366/134 |
| 2,670,850 A | 3/1954 | Wassberg | |
| 2,729,549 A * | 1/1956 | Reman | B01D 11/0434 208/311 |
| 2,850,362 A | 9/1958 | Scheibel | |
| 4,351,807 A | 9/1982 | Tels et al. | |
| 4,391,711 A * | 7/1983 | Jackson | B01D 11/0453 210/511 |
| 4,548,711 A | 10/1985 | Coombs et al. | |
| 4,571,299 A * | 2/1986 | Silvis | B01D 11/0223 210/511 |
| 4,657,401 A | 4/1987 | Galik | |
| 4,668,398 A * | 5/1987 | Silvis | B01D 11/0223 210/511 |
| 2004/0222153 A1 | 11/2004 | Baniel et al. | |
| 2009/0259034 A1 | 10/2009 | Kerr et al. | |

FOREIGN PATENT DOCUMENTS

| | | |
|---|---|---|
| WO | 9710886 | 3/1997 |
| WO | 2011087062 | 7/2011 |

* cited by examiner

LIQUID-LIQUID EXTRACTION SYSTEM AND PROCESS FOR USE THEREOF

BACKGROUND OF THE INVENTION

The present invention relates to a liquid-liquid extraction system. The present invention also relates to a process for using said system and the use of said system or process in removing aromatic compounds from organic streams, in treating an oil stream of a refinery, or in a liquid-liquid extraction process having at least two feed streams of different viscosity, similar density, or low interfacial tension.

Liquid-liquid extraction, which is also known as solvent extraction and partitioning, is a method to separate compounds based on their relative solubilities in two different immiscible liquids, often water and an organic solvent. It is an extraction of a substance from one liquid phase into another liquid phase and is of utility, for example, in the work-up after a chemical reaction to isolate and purify the product(s) or in removing valuable or hazardous components from waste or byproduct streams in a variety or industrial processes. The extracted substances may be inorganic in nature such as metals or organic such as fine chemicals. Therefore liquid-liquid extraction finds wide applications including the production of fine organic compounds, the processing of perfumes, nuclear reprocessing, ore processing, the production of petrochemicals, and the production of vegetable oils and biodiesel, among many other industries. Certain specific applications include the recovery of aromatics, recovery of homogeneous catalysts, manufacture of penicillin, recovery of uranium and plutonium, lubricating oil extraction, phenol removal from aqueous wastewater, and the extraction of acids from aqueous streams.

In a typical industrial application, a process will use an extraction step in which solutes are transferred from an aqueous phase to an organic phase. Typically a subsequent scrubbing stage is used in which undesired solutes are removed from the organic phase, and then the desired solutes are removed from the organic phase in a stripping stage. The organic phase may then be treated to make it ready for use again, for example, by washing it to remove any degradation products or other undesirable contaminants.

Counter-current liquid-liquid extraction processes are particularly useful in obtaining high levels of mass transfer due to the maintenance of a slowly declining differential over the path of the counter-current flow. For example, industrial process towers generally make use of counter-current liquid extraction systems in which liquids flow continuously and counter-currently through one or more chambers or columns. The chambers or columns may have specially designed apparatuses mounted within them such as agitators for affecting the physical properties (e.g., droplet size) of the liquid and tower packing which serves to obstruct the direct flow of the liquids. Packing also provides for increased contact between lighter rising liquids and heavier settling liquids, and better contact means higher efficiency of the mass transfer process.

Liquid-liquid process towers and their columns are typically constructed to provide descending flow of a heavier liquid from an upper portion of the tower and ascending liquid flow of a lighter liquid from a lower portion of the tower. It is generally desirable to provide apparatuses and methods affording efficient mass transfer, or liquid-liquid contact, such that contact of the fluids can be accomplished with a minimum pressure drop through a given zone of minimum dimensions. Therefore high efficiency and low pressure drop are important design criteria in liquid-liquid extraction operations. Sufficient surface area for liquid-liquid contact is necessary for the reduction or elimination of heavy liquid entrainment present in the ascending lighter liquid. Most often, it is necessary for the structured packing array in the column to have sufficient surface area in both its horizontal and vertical plane so that fractions of the heavy constituents are conducted downwardly, and the lighter liquid is permitted to rise upwardly through the packing with minimum resistance. With such apparatuses, the heavy and light constituents of the feed are recovered at the bottom and top of the tower, respectively.

Counter-current liquid-liquid extraction columns may be passive or static packed columns. Static extraction columns typically rely completely on the packing/internals and fluid flow velocities past the internals to create turbulence and droplets. They offer the advantages of (1) availability in large diameters for very high production rates, (2) simple operation with no moving parts and associated seals, (3) requirement for control of only one operating interface, and (4) relatively small required footprint compared to mixer-settler equipment. High flows are typically required for obtaining adequate mass transfer though. Such passive columns suffer from limitations in that channeling may occur in which very little contact occurs between the liquids. Another problem is that generally only relatively few and large droplets of the first liquid phase are dispersed for relatively short periods of time in the second continuous liquid phase in passive columns. Thus relatively low degrees of mixing and thus reduced mass transfer and stage efficiency are associated with passive or static columns. As a result applications of static extraction columns are typically limited to those involving low viscosities (less than about 5 cP), low to moderate interfacial tensions (typically 3 to 20 dyn/cm equal to 0.003 to 0.02 N/m), low to moderate density differences between the phases, and no more than three to five equilibrium stages.

The low mass-transfer efficiency of a static extraction column, especially for systems with moderate to high interfacial tension or density differences, may be improved upon by mechanically agitating or pulsating the liquid-liquid dispersion within the column to better control drop size and population density (dispersed-phase holdup). Many different types of mechanically agitated extraction columns have been proposed. The more common types include various rotary-impeller columns, and the rotating-disk contactor or pulsed columns such as the reciprocating-plate column. In contrast to static extraction columns, agitated extraction columns are well-suited to systems with moderate to high interfacial tension and can handle moderate production rates.

Nonetheless it is important to provide just the right amount of mixing in agitated extraction columns. Higher agitation (more mixing) minimizes mass transfer resistance during extraction but contributes to the formation of small and difficult-to-settle droplets or emulsions and thus entrainment or "flooding" in the process. In designing a liquid-liquid extraction process, normally the goal is to generate an unstable dispersion that provides reasonably high interfacial area for good mass transfer during extraction and yet is easily broken to allow rapid liquid-liquid phase separation after extraction. Therefore over agitation may unfortunately require very long subsequent settling times in order to separate the phases.

The incorporation of agitator systems into passive static extraction columns in order to allow for the input of energy for increasing mixing is known from U.S. Pat. No. 2,493,265; U.S. Pat. No. 2,850,362; and WO 97/10886. Such agitated packed columns are characterized by a series of several alternating mixing and calming sections. The mixing sections have an agitator to promote intimate equilibrium contact between the liquids. The calming sections contain packing to stop the circular motion of the liquids and to facilitate their separation. Nonetheless such agitated packed columns according to the prior art are not well suited for systems that tend to emulsify easily owing to the high shear rate generated by a rotating impeller. In particular, the use of alternating mixing and calming sections means that any emulsions that are separated by a calming section will simply be regenerated by the subsequent mixing section in the series. Therefore the emulsions will be progressively built up by the high shear rates in each mixing section over the path of the column.

An additional problem is that many physical properties may change significantly with changes in chemical concentration during extraction. These properties may include interfacial tension, viscosities, and densities, and they strongly affect the mass transfer and thus extraction performance. In particular, changes in these properties promote problems with emulsion formation for a particular set of column conditions. Extraction processes involving high degrees of mass transfer are particularly susceptible to such changes in physical properties over the column length. One type of extraction column—static (passive) or agitated (active)—will not be able to deal well such systems and their property changes.

In such cases of changing physical properties, apparatuses may be used based on a combination of two or more different individual columns. Each column may have a different design and type of internals for optimum use with the specific physical properties at that particular stage of the extraction. Such apparatuses however require two individual column shells, two sets of feed pumps and two sets of process controllers. The process streams are processed by passing sequentially through these at least two columns. Such apparatuses based on a combination of individual columns have several disadvantages such as requiring a large number of auxiliaries such as pumps and piping, and elaborate process control means. Furthermore internals like distributors and/or collectors and phase separation will be necessary between each of the various columns of the apparatus.

The earlier discussed agitated packed columns of U.S. Pat. No. 2,493,265; U.S. Pat. No. 2,850,362; and WO 97/10886 are also not suited to extraction of systems involving high mass transfer and/or significant changes in physical properties due to changes in concentrations over the course of the extraction process and column. The disclosed columns are based on a substantially symmetrical arrangement of alternating mixing and calming sections over the column length, whereas the chemical concentration of the specie and physical property are asymmetrical over the extraction and will either increase or decrease along the column axis. Therefore the disclosed columns cannot take advantage of the particular suitability of a mixing versus a static section for a particular concentration and set of physical properties at the start versus the end of the extraction process (e.g. at the bottom versus the top or vice versa in the case of a substantially vertical column).

Alternatively, the use of cascades of combined single-stage mixer-settler tanks are known for use in extraction processes, for example, CN101219289(A) discloses such systems for the extraction of high flow rate solvent. Such cascade systems are not economical in cases where higher extraction efficiency is required because this will require a large number of mixer-settlers, and a large number of mixer settlers requires a large investment, as well as room space or "footprint". An additional disadvantage of such cascades is that a control loop is needed for each of the devices.

US 2004/0222153 A1 discloses combinations of extraction and back extraction processes in which an extractor, such as a mixer settler, is combined with a back extractor in the recovery of 1,3-propanediol from an aqueous feed stream. However such systems do not address the problem of the extraction of liquid systems involving significant changes in physical properties while still offering adequate mass transfer efficiency and without a tendency to form emulsions or entrainment. Instead the systems of US '153 A1 address the problem of how to recover a diol from a solvent by back extraction after the diol is extracted to solvent from an aqueous stream by solvent in a first stage. Thus the flow patterns of the streams to the extractor and back extractor in US '153 A1 are quite different from those in multistage extraction systems.

Another alternative is to use centrifugal extractors, for example, as disclosed in U.S. Pat. No. 1,105,954 or U.S. Pat. No. 2,670,850. However by nature, such centrifugal machines are costly in terms of both investment and operation. They are additionally complex machines, and their high speed rotations require specialized mechanical devices and entail safety and noise concerns.

In conclusion, it would be desirable to have an liquid-liquid extraction system that would be better suited for extraction of liquid systems involving significant changes in physical properties than those of the prior art, and while still offering adequate mass transfer efficiency and without a tendency to form emulsions or entrainment and without requiring large investments, complex process controls, and extensive footprints.

SUMMARY OF THE INVENTION

Starting from this state of the art, it is an object of the invention to provide a simplified counter-current liquid-liquid extraction system that does not suffer from the previous mentioned deficiencies, particularly a lack of adequate mass transfer efficiency and/or tendency to form emulsions, especially when working with systems involving high mass transfer and/or significant changes in physical properties during the extraction process. Further objects of the invention include providing a process for using said system and a use of said system or process in removing aromatic compounds from organic streams, in treating an oil stream of a refinery, or in a liquid-liquid extraction process having at least two feed streams of different viscosity, similar density, or low interfacial tension.

According to the invention, these objects are achieved by a liquid-liquid extraction system adapted for the flow of two or more liquids therein comprising:
(i) a mixer settler sub-system comprising: one or more mixer settlers connected in series, a first inlet for a first liquid feed stream, a second inlet for a second liquid feed stream, a first outlet for a first product stream, a second outlet for a first byproduct stream,
(ii) a counter-current liquid-liquid extraction column and comprising within one common vessel: a first inlet for a third liquid feed stream, a second inlet for a fourth liquid feed stream, a first outlet for a second product stream, a second outlet for a second byproduct stream, either a mixing section comprising an agitation means and/or a static section comprising an internal, wherein the first outlet of the mixer settler sub-system is in fluid communication with the first inlet of the column and the second inlet of the mixer settler sub-system is in fluid communication with the second inlet of the counter-current liquid-liquid extraction column.

According to the invention, these further objects are achieved firstly by a counter-current liquid-liquid extraction process, wherein to the said system a first liquid feed stream is fed by means of the first inlet and a second liquid feed stream is fed by means of the second inlet, liquid-liquid contact occurs between the first and second liquid feed streams within the mixer settler sub-system to form a first product stream and a first byproduct stream, and the formed first product stream is removed by means of the first outlet, and the formed byproduct stream is removed by means of the second outlet,
the first product stream is fed as a third liquid feed stream to the column by means of the first inlet of the column and a fourth liquid feed stream is fed by means of the second inlet of the column, liquid-liquid contact occurs between the third feed stream and the fourth feed stream within the column to form a second product stream and a second byproduct stream, and the second product stream is removed by means of the first outlet of the column, and the second byproduct stream is removed by means of the second outlet of the column, and the second liquid feed stream to the mixer settler sub-system is in fluid communication with the fourth liquid feed stream to the column.

Said column and said process is used in accordance with the invention in removing aromatic compounds from organic streams, in treating an oil stream of a refinery, or in a liquid-liquid extraction process having at least two feed streams of different viscosity, similar density, or low interfacial tension.

The present invention achieves these objects and provides a solution to this problem by means of the first outlet of the mixer settler sub-system in fluid communication with the first inlet of the column and the second inlet of the mixer settler sub-system in fluid communication with the second inlet of the counter-current liquid-liquid extraction column. As a result, a first extraction step takes place within the mixer settler sub-system in which the earlier mentioned high mass transfer and/or change of physical properties occur. Due to its design and nature, the mixer settler sub-system conveniently allows a residence time long enough for a successful total phase separation to be performed providing then first product and byproduct streams comprising the different phases. The thus treated first product stream can subsequently be fed to optional further mixer-settlers or directly to the extraction column in order to obtain the required separation efficiency.

In the case of systems involving high mass transfer and/or significant changes in physical properties during the extraction process, sufficient residence time may be provided in the mixer settler sub-system so that the high mass transfer and/or significant changes occur within the mixer settler such that a sufficiently high degree of or even total phase separation takes place within the sub-system. Sufficient residence time may be provided by proper design of the sub-system, for example, using a sufficient number of mixer settlers or providing the sub-system with sufficient volume. During operation, residence time may be increased by reducing the flow rates of the feed streams to the sub-unit.

These results are then surprisingly achieved without the need for any special elaborate apparatuses involving the combination of multiple columns, each with their own individual column shells, sets of internals, sets of feed pumps and sets of process and level controllers.

In a preferred embodiment of the system or process, the mixer settler sub-system contains only two mixer settlers connected in series. In liquid systems involving very large-scale mass transfer and/or physical property changes, a single mixer settler will not provide sufficient phase separation so that the subsequent extraction column is operated outside of the critical region. In such undesirable cases, in either the top or bottom portion the column, the difference in viscosity between the entering feed stream and the exiting product or byproduct stream is too high and/or the difference in density or the interfacial tension is too low for a high separation efficiency to occur.

In a preferred embodiment of the system for the separation of a first liquid feed stream that has a lower density than a second liquid feed stream, the column comprises both a mixing section comprising an agitation means and a static section comprising an internal, additionally optionally comprising a collector and/or distributor, wherein the first inlet of the column, the static section and the second outlet of the column are all substantially located within a bottom portion of the column, and wherein the second inlet of the column, the mixing section, and the first outlet of the column are all substantially located within a top portion of the column, and wherein the first inlet and the second outlet of the sub-system are both substantially located within a bottom portion of the sub-system, and wherein the second inlet and the first outlet of the sub-system are both substantially located within a top portion of the sub-system. This embodiment is particularly favourable for extraction processes involving large-scale mass transfer and/or physical property changes in which a lower density first liquid feed stream is to be extracted using a higher density solvent (the second and fourth liquid feed streams).

Likewise, in a preferred embodiment of the process in which the density of the first liquid feed stream is less than the density of the second liquid feed stream, the first inlet, the static section, if present, and the second outlet of the column are all substantially located within a bottom portion of the column, and wherein the second inlet, the mixing section, if present, and the first outlet of the column are all substantially located within a top portion of the column, and the first inlet and the second outlet of the sub-system are both substantially located within a bottom portion of the sub-system, and wherein the second inlet and the first outlet of the sub-system are both substantially located within a top portion of the sub-system. This process then has the same advantages of the previously mentioned system.

In a specific preferred embodiment of the process, the first liquid feed stream, first product stream, third liquid feed stream, and second product stream each comprise one or more organic compounds, preferably two or more organic compounds, most preferably consists essentially of organic compounds and the second liquid feed stream, first byproduct stream, a fourth liquid feed stream and second byproduct stream each comprise water, preferably consists essentially of water. Liquid-liquid extraction involving organic compounds and water typically involves substantial changes in physical properties during the course of the extraction, and thus such extractions benefit especially from the system and process of the invention.

In another specific preferred embodiment of the process, the second liquid feed stream and the fourth liquid feed stream each comprise a solvent, preferably the same solvent, and the first liquid feed stream and the third liquid feed stream each comprise an oil and an aromatic compound, preferably the same oil and the same aromatic compound, wherein the aromatic compound is extracted from the first liquid feed stream by counter-current contact with second liquid feed stream within the mixer settler sub-system and the aromatic compound is extracted from the third liquid feed stream by counter-current contact with the fourth liquid feed stream within the column to yield a purified oil, wherein the extracted aromatic compound is removed with the solvent as part of the first and second byproduct streams by means of the second outlet located within a bottom portion of the sub-system and by means of the second outlet located within a bottom portion of the column, and wherein the purified oil is removed as part of the first and second product streams by means of the first outlet located within the top portion of the sub-system and by means of the first outlet located within the top portion of the column. Liquid-liquid extraction of aromatic compounds from oils typically involves substantial changes in physical properties during the course of the extraction, and thus such extractions benefit especially from the system and process of the invention.

In another preferred embodiment of the system for the separation of a first liquid feed stream that has a higher density than a second liquid feed stream, the column comprises both a mixing section comprising an agitation means and a static section comprising an internal, and additionally optionally comprising a collector and/or distributor, wherein the first inlet, the static section and the second outlet of the column are all substantially located within a top portion of the column, and wherein the second inlet, the mixing section, and the first outlet of the column are all substantially located within a bottom portion of the column, and wherein the first inlet and the second outlet of the sub-system are both substantially located within a top portion of the sub-system, and wherein the second inlet and the first outlet of the sub-system are both substantially located within a bottom portion of the sub-system. This embodiment is particularly favourable for extraction processes involving large-scale mass transfer and/or physical property changes in which a higher density first liquid feed stream is to be extracted using a lower density solvent (the second and fourth liquid feed streams).

Likewise, in a preferred embodiment of the process in which the density of the first liquid feed stream is greater than the density of the second liquid feed stream, the first inlet, the static section, if present, and the second outlet of the column are all substantially located within a top portion of the column, and wherein the second inlet, the mixing section, if present, and the first outlet of the column are all substantially located within a bottom portion of the column, and wherein the first inlet and the second outlet of the sub-system are both substantially located within a top portion of the sub-system, and wherein the second inlet and the first outlet of the sub-system are both substantially located within a bottom portion of the sub-system. This process then has the same advantages of the previously mentioned system.

In a specific preferred embodiment of the process, the second liquid feed stream, first byproduct stream, fourth liquid feed stream and second byproduct stream each comprise one or more organic compounds, preferably two or more organic compounds, most preferably consists essentially of organic compounds and the first liquid feed stream, first product stream, third liquid feed stream, and second product stream each comprise water, preferably consists essentially of water. As discussed earlier, extractions involving organic compounds and water typically involve substantial changes in physical properties during the extraction and thus benefit from the system and process of the invention.

In certain preferred embodiments of the system and the process, the column comprises both a mixing section comprising an agitation means and a static section comprising an internal.

In certain preferred embodiments of the system and the process, the column additionally comprises a collector and/or distributor. A collector may be beneficially used to intercept liquid blowing down the column, for example, to use in feeding to a redistributor when the diameter of the column significantly changes, to aid in removal of liquid from the column, to remove liquid for recirculation in a "pump-around" loop, or to improve the mixing of a feed stream with a downward flowing liquid. For example, the static section(s) of the column will often have a smaller diameter than the mixing section. The even distribution of liquid and flow rates over the column cross-section by means of a distributor, especially in the case of a static section having packing, will strongly contribute to efficiency of the column and its internals. Therefore the use of a liquid distributor at all locations on the column at which a liquid feed stream is introduced will be beneficial.

In yet another preferred embodiment of the column of the system, the packing comprises trays, a random packing, a structured packing, or combinations thereof. In the column, one of the liquids tend to wet the surface of the packing better and the other liquid passes across this wetted surface, where mass transfer takes place. Therefore packing will improve the intimate contact between the phases. Trays, random packing, and structured packing are particularly efficient in effecting this transfer. In particular, random and structured packings offer the advantage of a lower pressure drop across the column compared to plates or trays. Combinations of trays and structured packings make possible a combination of each of their respective favourable properties.

In still yet another preferred embodiment of the extraction system or process, the column additionally comprises a third inlet located between the first inlet and the second inlet for the addition of a fifth liquid feed stream. A fifth liquid feed stream may comprise one or more extractants to beneficially increase the capacity of a solvent for the component to be extracted. Alternatively the fifth liquid feed stream may be a second solvent having specific selectivity for dissolving another component of the feed stream to be extracted. The use of additional solvents thus beneficially allows the selective extraction of additional components or the extraction process to be combined with a stripping, scrubbing or washing step within the same column.

In still yet another preferred embodiment of the process, wherein one each of the pairs of streams, namely the first and second feed stream to the sub-system, the first product and byproduct stream from the sub-system, the third and fourth feed stream to the column, and the second product and byproduct stream from the column, comprises one or more organic compounds, preferably two or more organic compounds, most preferably consists essentially of organic compounds, and the other stream in each of the pairs comprises water, preferably consists essentially of water. Such streams typically have quite different densities and often their physical properties change due to the mass transfer over the column. Therefore these streams benefit greatly from the process of the invention.

Further aspects of the present invention include the use of the system or the process of the invention in removing aromatic compounds from organic streams, in treating an oil stream of a refinery, or in a liquid-liquid extraction process in which one of the third or fourth liquid feed streams and one of the second product or byproduct streams are both substantially located within the top or bottom portion of the column and their viscosity difference is greater than 0.1 cP, or their density difference is less than 60 kg/m$^3$, or their interfacial tension is less than 20 mN/m. Such use benefits then from the previously discussed advantages of the column and the process of the invention.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more system claims or the subject matter of a mixture of one or more process claims and system claims. By analogy, the subject matter of any one system claim may be combined with the subject matter of one or more other system claims or the subject matter of one or more process claims or the subject matter of a mixture of one or more process claims and system claims.

One skilled in the art will understand that the combination of the subject matters of the various embodiments of the invention is also possible without limitation in the invention to the extent that such combinations are technically feasible.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

Figure 1:
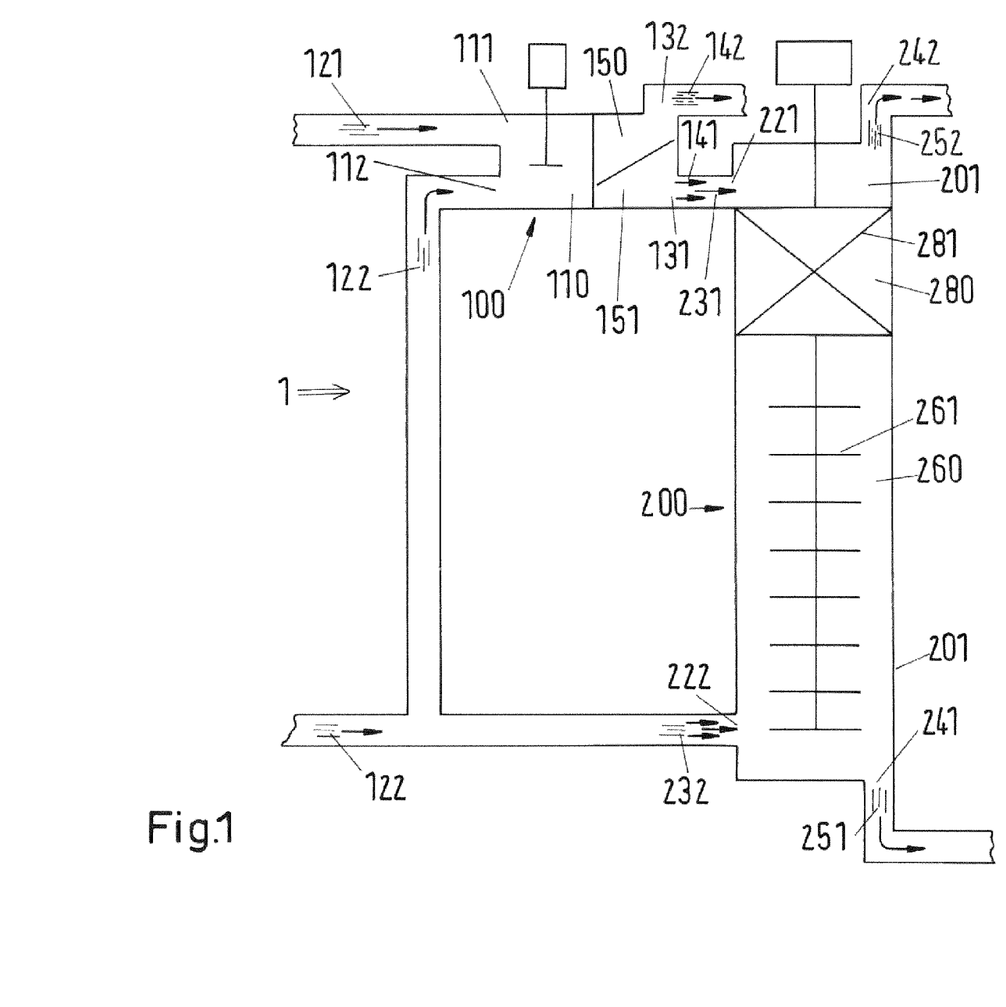
FIG. 1 shows a schematic view of an embodiment of a liquid-liquid extraction system according to the invention.

FIG. 1 shows a schematic view of an embodiment of a liquid-liquid extraction system according to the invention, which as a whole is labeled with reference number 1. The extraction system 1 is not specifically limited as to form, shape, construction or composition unless specifically indicated otherwise. Any material that can be fabricated can be made into an extractor system 1. For reasons of economy, extractor system shells are often made from FRP fiberglass reinforced plastic, stainless steel, Alloy 20, or any other material indicated for the specific application. Extraction system internal components can be made from polypropylene or other plastics for low initial cost, or any other materials including metals depending upon the process requirements. In one embodiment the extraction system 1 and its components are constructed of metals, plastics, glass or mixtures thereof. Suitable metals include carbon steel, stainless steel, nickel alloys, copper alloys, titanium and zirconium. Suitable engineering plastics include fluoropolymers such as PTFE, PVDF, or ETFE; PVC; and polypropylenes.

Extractor systems and their components (e.g. mixer settlers and columns), construction, and operation are well known in the art, for example, as disclosed in Chemical Engineering Design, Vol. 6, Coulson & Richardson's Chemical Engineering Series, by R. K. Sinnott, John Metcalfe Coulson, and John Francis Richardson, 4th Ed. Published in 2005 by Elsevier (ISBN 0 7506 6538 6), Principles Of Mass Transfer And Separation Process, by Binay K. Dutta, published in 2007 by Prentice Hall of India (ISBN-978-81-203-4), or Handbook of Solvent Extraction by T. C. Lo and M. H. I. Baird, edited by C. Hanson, published in 1991 by Krieger Pub. Co. (ISBN-13: 978-0894645464). Unless indicated otherwise, conventional construction materials and means, as well as components and auxiliaries, may be used for the extraction system 1, and the extraction system 1 may be operated in an extraction process in a conventional manner as known in the art.

The liquid-liquid extraction system 1 is adapted for the flow of two or more liquids therein comprising:

(i) a mixer settler sub-system 100 comprising: one or more mixer settlers 110 connected in series, a first inlet 111 for a first liquid feed stream 121, a second inlet 112 for a second liquid feed stream 122, a first outlet 131 for a first product stream 141, a second outlet 132 for a first byproduct stream 142, (ii) a counter-current liquid-liquid extraction column 200 and comprising within one common vessel 210: a first inlet 221 for a third liquid feed stream 231, a second inlet 222 for a fourth liquid feed stream 232, a first outlet 241 for a second product stream 251, a second outlet 242 for a second byproduct stream 252, either a mixing section 260 comprising an agitation means 261 and/or a static section 280 comprising an internal 281, wherein the first outlet 131 of the mixer settler sub-system 100 is in fluid communication with the first inlet 221 of the column 200 and the second inlet 112 of the mixer settler sub-system 100 is in fluid communication with the second inlet 222 of the counter-current liquid-liquid extraction column 200.

Note: the specific embodiment of FIG. 1 has both a mixing section 260 and a static section 280, but the system 1 of the invention may also have only either a mixing section 260 or a static section 280. One skilled in the art will understand that the mixer settlers 110 are connected "in series" whenever there are two or more mixer settlers 110.

The liquids to be used with the system 1 are not specifically limited and each liquid; each liquid feed stream, 121, 122, 231, 232, and 253; each byproduct stream 142 and 252; and each product stream 141 and 251 may comprise one or more organic compounds, solvents, water or mixtures thereof. One skilled in the art will understand that the use of the terms product and byproduct is not specifically limited, and the use of such terminology will simply assist in describing the various embodiments of the invention and the drawings of the present application. The product streams 141 and 251 and the byproduct streams 142 and 252 are not specifically limited, and both types of streams may contain valuable materials of commercial and/or industrial interest. In addition, both types of streams may comprise solvent or carrier liquids.

The system 1 shown in FIG. 1 will typically be used for the separation of a first liquid feed stream 121 that has a higher density than a second liquid feed stream 122, as in the system 1 of claim 4 or the process of claim 9, in order to take advantage of gravity as a driving force for the process.

The mixer settler sub-system 100 and its one or more mixer settlers 110 connected in series are all conventional, as known in the art. They are described in the earlier cited text and reference books, and specific examples are also disclosed in the patent literature, for example, in CA 616281 A or CA 682992 A. A mixer settler consists of a first stage that mixes the phases together followed by a quiescent settling stage that allows the phases to separate by gravity. The mixer may consist of one or more stages of mixing tanks. Industrial scale mixers may consist of up to three mixer stages where each stage performs a combined pumping and mixing action. Use of multiple stages allows a longer reaction time and also minimizes the short circuiting of unreacted material through the mixers. The settler is a calm pool downstream of the mixer where the liquids are allowed to separate by gravity. The liquids are then removed separately from the end of the mixer.

The settler may preferably contain internals such as distributing, contacting (mass transfer), defoaming, or coalescing internals. Specific preferred embodiments of internal include distribution picket fences, distribution vanes, trays, baffles and random packed media. Enhanced settler performance may be obtained by improved the feed distribution and the coalescence and eliminating macro eddies induced by the feed and discharge arrangements.

The sub-system 100 may comprise one, two, or three or more mixer settlers 110. In a preferred embodiment of the system or process, the mixer settler sub-system 100 contains only two mixer settlers 110 connected in series. In liquid systems involving very large-scale mass transfer and/or physical property changes, a single mixer settler will not provide sufficient phase separation (column 200 will therefore be in critical region) so two mixer settlers 110 will be required. More than two mixer settlers 110 is less desirable due to the significant investment and footprint required.

The various inlets 111, 112, 131, and 132 and outlets 131, 132, 241, and 242 are all conventional, as known in the art. The locations of the inlets 111 and 112 and outlets 131 and 132 within the mixer settler sub-system 100 and the inlets 221 and 222 and outlets 241 and 242 within the extraction column 200 are not specifically limited. In the embodiment shown in FIG. 1 the inlet 121 and outlet 132 are located within a top portion 150 of the sub-system 100, the inlet 112 and outlet 131 are located within a bottom portion 151 of the sub-system 100, the inlet 221 and outlet 242 are located within a top portion 202 of the column 200, the inlet 222 and outlet 241 are located within a bottom portion 201 of the column 200. One skilled in the art will understand that other configurations are within the scope of the invention.

In the embodiment shown in FIG. 1, the mixing section 260 is located within the common vessel 210 and below a static section 280, which is also located within the common vessel 210. On skilled in the art will understand that other arrangements of the mixing section 260 and the static section 280 are possible. For example, in the embodiment shown in FIG. 2 the mixing section 260 is above the static section 280. In some embodiments, it will be preferred to have the static section(s) 280 located within portions of the column 200 in which there is only a small difference in the densities of the liquids, and to have the mixing section 260 located within a portion of the column 200 in which there is a large difference in the densities of the liquids.

The mixing section 260 comprises an agitation means 261, which is conventional as known in the art and not specifically limited. The agitation means 261 generates the agitation of the liquids within the mixing section 260 as the liquids pass in countercurrent flow through this section 260. The agitation imparted thereto is designed to reduce the size of liquid phase droplets dispersed into another continuous phase liquid.

In certain embodiments the agitation means 261 comprises one or more paddle agitators, discs, turbines, or their combinations. In the specific embodiment shown in FIG. 1, the agitation means 261 comprises paddle agitators. Rotation of the vertical shaft of the agitation means 261 creates agitation with a non-vertical thrust. Agitation from such paddle agitators and the like has been shown to produce an extremely fine dispersed droplet configuration in such assemblies. In one embodiment, the blades are pitchless, being vertically mounted to produce intimate mixing without imparting either an upward or downward thrust on the liquid mixture, thereby permitting the liquids to separate by gravity due to their different densities.

In the embodiment shown in FIG. 1, the paddle agitators are rotated by means of a vertical shaft connected to a motor (not labeled for clarity). The motor is conventional, and in one embodiment it is a variable speed drive electric motor. In general, electrically powered agitators will be preferred. In many embodiments, it will be preferred to have the motor located substantially above the column so that the liquid phases are not in contact with the motor shaft seals. Such embodiments are easier to maintain, more durable, and safer due to a lesser likelihood of leakage. In embodiments in which a motor is connected to the agitators by means of a shaft passing through a static section 280, as in FIG. 1, it will be preferred to use doughnut shaped internals 281 to facilitate passage of the shaft. According to another preferred embodiment, the agitation means 261 comprises either a magnetic drive unit or a motor, wherein the motor is located substantially above or substantially to the side of the mixing section 260. Magnetic drive units are beneficial in that they do not require holes and thus seals in the wall of the common vessel of the column for their operation. Therefore they will have lesser problems with potential leakage. Locating the motor to the side of the mixing section will eliminate the need for making a hole through a static section for the motor shaft.

Each static section 280 comprises an internal 281. The internal 281 is conventional and well known in the art, such as a tray, random packing, structured packing, or their combinations. In one preferred embodiment structured packing is used due to its superior performance. In certain embodiments the packing comprises mass transfer elements known in the art as random packings, such as Raschig and/or Pall rings, saddles, such as e.g. Berl saddles, spheres, hooks, or by the tradenames NOR-PAC™, BIO-NET™, or Hel-X™. In certain other embodiments, the packing comprises structured packings such as those known by the trademarks Mellapak™, Montz-Pak™ Ralu-Pak™, SMV™, or Raschig Super-Pak™. In certain other specific embodiments the packings are made of fabric. In another preferred embodiment, a combination of trays and structured packing is made, preferably one in which a dual flow tray is located in between each packing element.

In yet a further preferred embodiment of the system 1, the column 200 additionally comprises a pulsing means in fluid connection with the column 200 for increasing shear stress and dispersion within the column 200. Likewise in a further preferred embodiment of the process, a liquid within the column 200 is pulsed by a pulsing means in order to increase the shear stress on and the dispersion of the liquid.

Figure 2:
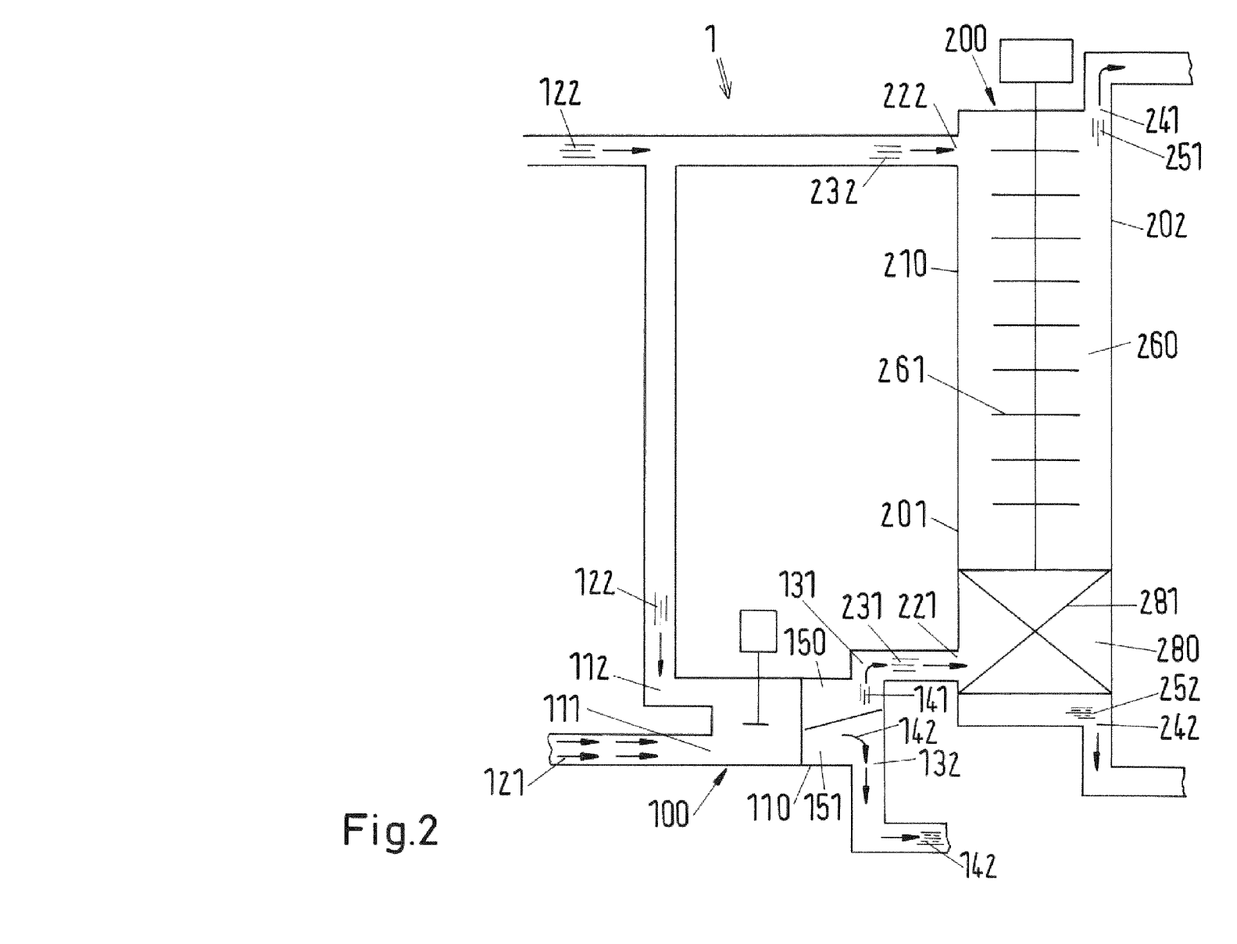
FIG. 2 shows a schematic view of another embodiment of a liquid-liquid extraction system according to the invention.

FIG. 2 shows a schematic view of another embodiment of a liquid-liquid extraction system 1 according to the invention. The system 1 shown in FIG. 2 will typically be used for the separation of a first liquid feed stream 121 that has a lower density than a second liquid feed stream 122, as in the system 1 of claim 3 or the process of claim 8, in order to take advantage of gravity as a driving force for the process. As exemplified by this specific embodiment, the column 200 may also comprise one or more collector(s) 290 and/or distributor(s) 291 for the collection and distribution of liquids.

Densities in the present application refer to the mass per unit volume such as kg/m3 or g/cm3. Denisites of liquids may be conveniently measured by means of pycnometer, devices based on gamma radiation attenuation, accurate separate measurements of volume and mass, or oscillating U-tube method (Biegeschwinger principle). In the present application, the density of a stream or liquid refers to its density as measured by means of a pycnometer.

Figure 3:
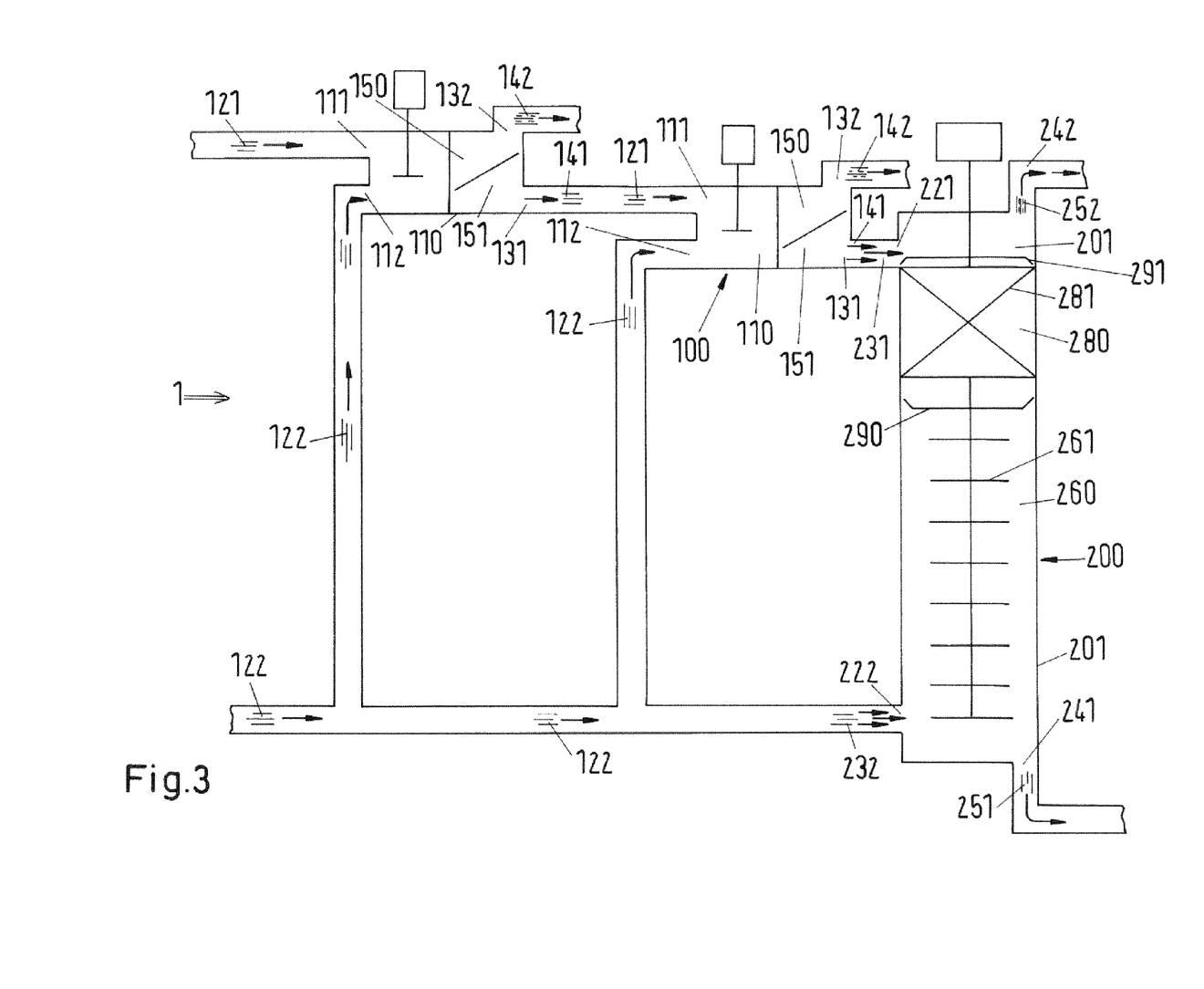
FIG. 3 shows a schematic view of a preferred embodiment of a liquid-liquid extraction system according to the invention, in which the mixer settler sub-system contains only two mixer settlers connected in series.

FIG. 3 shows a preferred embodiment of a system 1 according to the invention, in which the mixer settler sub-system 100 is the preferred embodiment of only two mixer settlers 110 connected in series. The system 1 shown in FIG. 3 will typically be used for the separation of a first liquid feed stream 121 that has a higher density than a second liquid feed stream 122 in order to take advantage of gravity as a driving force for the process. In this particular embodiment "fresh" second liquid feed stream 122 is fed to each of the mixer settlers 110 by means of their second inlets 112. The embodiment in FIG. 3 has one collector 290 and one distributor 291, which are located below and above a static section 280 in the top portion 202 of the column 200.

The collectors 290 and distributors 291 are conventional and well-known in the art for the collection of liquids or distribution of liquids in columns 200. Collector types include chimney tray, Chevron-type, trough liquid, and deck liquid collectors. Collectors 290 are typically used in columns for total draw-off of a liquid to product or pump-around pump down loops, partial draw-off of a liquid with overflow continuing down the column, or collection of liquid for mixing. Typically Chevron-type and trough liquid collector plates require less column height than deck-style collectors, and thus they are preferred where column height is limited.

One skilled in the art will understand that that the performance of a column extractor can be significantly affected by how uniformly the feed and solvent inlet streams are distributed to the cross section of the column 200. The requirements for distribution and redistribution vary depending upon the type of column internals (packing, trays, agitators, or baffles) and the impact of the internals on the flow of dispersed and continuous phases within the column 200. Important aspects of the distributor include the number of holes and the hole pattern (geometric layout), hole size, number of downcomers or upcomers (if used) and their placement, the maximum to minimum flow rates the design can handle (turndown ratio), and resistance to fouling. Liquid distributors are typically used to achieve uniform liquid distribution across the column cross section, and distributors 291 are often located above an internal 281, for example, one comprising trays, a random packing, a structured packing, or combinations thereof. Useful distributor 291 types include splash plate, channel types with bottom holes or lateral tubes, pipe orifice, chimney tray, ladder type, pan, deck, trough, pipe arm, trickling or spraying device, spray condenser, sprinkler, spray, and weir overflow distributors.

Figure 4:
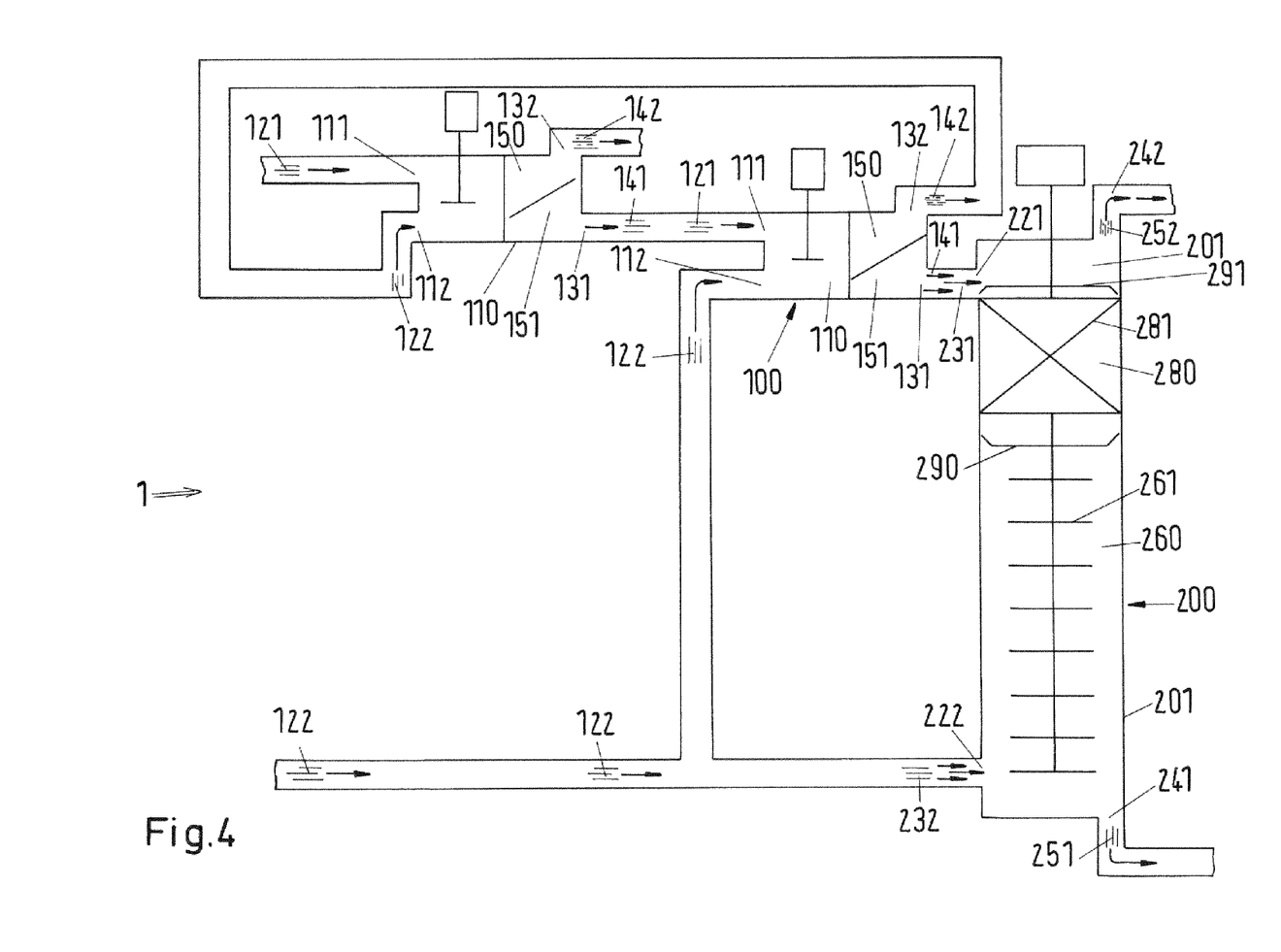
FIG. 4 shows a schematic view of a particularly preferred embodiment of the system of FIG. 3 but in which there is a recirculation of the byproduct stream 142.

FIG. 4 shows a preferred embodiment of the system 1 of FIG. 3. In this preferred embodiment the second outlet 132 for a first byproduct stream 142 of the second mixer settler 110 in the series is in fluid communication with the second inlet 112 for the second liquid feed stream 122 of the first mixer settler 110 in the series. In preferred embodiments of the invention having more than one mixer settler 110 in series, there will be a counter-current flow in the series of mixer settlers 110 (due to a recirculation). The counter-current flow has several advantages, such as using less solvent in the mixer settlers due to reuse of the solvent and a better distribution of the driving force of the process. This improved distribution is analogous to the improved heat distribution in heat transfer processes by means of counter-current versus co-current flow. In the embodiment shown in FIG. 4, there is a contact between fresh second liquid feed stream 122 (e.g. solvent) and a first liquid feed stream 121 that has been pre-extracted already in the second mixer settler 110. The "preloaded" second liquid feed stream 122 (e.g. "preloaded" solvent) leaves the second settler 110 then as the first byproduct stream 142 and is recirculated back to the first mixer settler.

Figure 5:
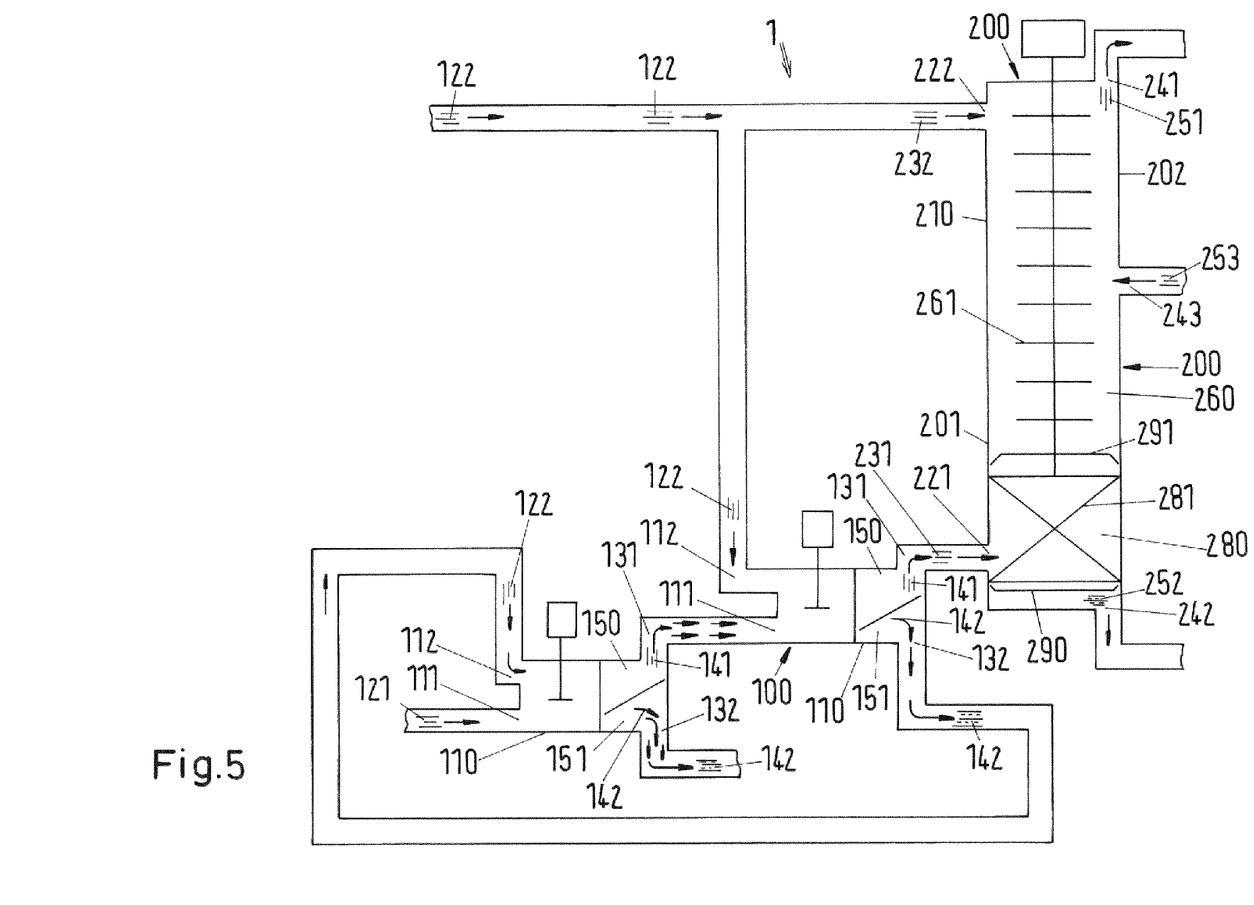
FIG. 5 shows a schematic view of another preferred embodiment of a liquid-liquid extraction system according to the invention, in which the mixer settler sub-system contains only two mixer settlers connected in series and in which there is a recirculation of the byproduct stream 142.

FIG. 5 shows a schematic view of yet another preferred embodiment of a system 1 according to the invention, in which the mixer settler sub-system 100 has only two mixer settlers 110 connected in series. The embodiment in FIG. 4 has one collector 290 and one distributor 291, which are located below and above a static section 280 in the bottom portion 201 of the column 200. The system 1 shown in FIG. 4 will typically be used for the separation of a first liquid feed stream 121 that has a lower density than a second liquid feed stream 122 in order to take advantage of gravity as a driving force for the process. As exemplified by this specific embodiment, the column 200 may also comprise a third inlet 243 located between the first inlet 221 and the second inlet 222 and for the addition of a fifth liquid feed stream 253, such as an extractant and/or solvent. A fifth liquid feed stream 253 may beneficially increase the capacity of a solvent, have specific selectivity for dissolving additional components, or allow the extraction process to be combined with a stripping, scrubbing or washing step within the same column 200. The location of the third inlet 243 is not specifically limited.

As also exemplified by this embodiment of FIG. 5, there is also preferentially a counter-current flow in the mixer settlers 110 in series in sub-system 100 (due to the recirculation). Such counter-current flows may be preferably used in any sub-system with two or more mixer settlers in series. In an alternative embodiment (not shown) "fresh" first liquid feed stream 122 is fed to each of the mixer settlers 110 in the series by means of their first inlets 111. In another specific preferred embodiment shown in FIG. 6, an additional loop or recirculation is present in the system 1 of FIG. 5 such that a preloaded stream (second byproduct stream 252) of the column 200 is used as a feed stream (second liquid feed stream 122) to a mixer settler 110 in the series. Thus in some embodiments of the invention, a preloaded byproduct stream from a mixer settler 110 and/or the column 200 may be used as a feed stream to a (different) mixer settler 110. Such loops and recirculations may allow counter-current flows, have hydrodynamic advantages (smooth concentration gradient) and/or make more efficient use of solvents.

Although not shown in the schematic figures for simplicity, one skilled in the art will understand that other conventional column internals may be used without limitation in the invention, such as feed devices like feed pipes and/or sumps, bed limiters, support plates and grids, dispersers, disperser/support plates, continuous phase distributors, packing support and hold-down plates, entrainment separators, and retainers/redistributors. Suitable column internals are disclosed for example in the technical brochure "Internals for Packed Columns" from Sulzer Chemtech as publication 22.51.06.40-XII.09-50.

Auxiliaries for the system 1 and its sub-system 100 and column 200 are conventional and well-known in the art and include electrical supplies, level controllers, pumps, valves, pipes and lines, reservoirs, drums, tanks, and sensors for measuring such parameters as flow, temperatures and levels. The column 1 and the extraction process will be conveniently controlled by means of a computer interface equipped with appropriate sensors.

One skilled in the art will understand that the optimum selection and arrangement of the column internals will depend on which phase (light or heavy) is continuous and which is dispersed in the extraction process. Feed pipes to control the velocity of the feeds are recommended.

This extraction process of the invention has the benefit of making possible a reduction in energy of the process. This is both more economical and makes the process milder, thereby minimizing problems of entrainment or emulsion formation. Without wishing to be bound to any particular mechanism or mode of operation, it is believed that the system 1 allows a first extraction step having a high mass transfer and/or change of physical properties to take place in the first mixer settler 110 of the mixer settler sub-system 100, in which the residence time in the settling stage(s) are sufficient for a successful total or near-total phase separation to be performed. The treated stream can then be treated optionally in one or more further mixer settlers 110 and then finally in the column 200 in order to obtain the required separation efficiency. This then avoids the operation of the column 200 in the critical region in which high mass transfer and/or large-scale changes in physical properties occur.

Extraction processes are well known in the art, for example, as disclosed in Chemical Engineering Design, Vol. 6, Coulson & Richardson's Chemical Engineering Series, by R. K. Sinnott, John Metcalfe Coulson, and John Francis Richardson, 4th Ed. Published in 2005 by Elsevier (ISBN 0 7506 6538 6) or Handbook of Solvent Extraction by T. C. Lo and M. H. I. Baird, edited by C. Hanson, published in 1991 by Krieger Pub. Co. (ISBN-13: 978-0894645464). Unless indicated otherwise, conventional extraction processes and their various liquids and operating parameters and conditions may be used in the extraction processes according to the invention and making use of the system 1 and its mixer settler sub-system 100 and column 200.

Conventional extraction process include fractional extraction, dissociative extraction, pH-swing extraction, reaction enhanced extraction, extractive reaction, temperature-swing extraction, reversed micellar extraction, aqueous two-phase extraction. Hybrid extraction processes include extraction-distillation, extraction-crystallization, neutralization extraction, reaction-extraction, and reverse osmosis extraction.

It will often be preferred in some embodiments to disperse the pair of liquid feed streams 121 and 231 or 122 and 232 with the higher flow rate in order to generate maximum interfacial content. In other embodiments, the one pair of liquid feed streams with the lower flow rate will preferably be dispersed when the other pair of liquid feed stream with the higher flow rate has a higher viscosity or preferentially wets the packing surface.

Viscosities of streams and liquids may be measured by various types of viscometers and rheometers. In the present application, viscosity refers to viscosity as measured by ASTM D 445, Test Method for Kinematic Viscosity of Transparent and Opaque Liquids.

It is noted that the presence of any surfactants may alter surface properties to such an extent that the performance of the extraction process cannot be accurately predicted. Therefore preferred embodiments of the process will take place in the absence of any significant surfactant content.

In addition to the being easily recoverable and recyclable, the solvent liquid used in liquid-liquid solvent extraction should have a high selectivity (ratio of distribution coefficients), be immiscible with the carrier liquid, have a low viscosity, and have a high density difference (compared to the carrier liquid) and a moderately low interfacial tension. Common industrial solvents generally are single-functionality organic solvents such as ketones, esters, alcohols, linear or branched aliphatic hydrocarbons, aromatic hydrocarbons, and so on; or water, which may be acidic or basic or mixed with water-soluble organic solvents. More complex solvents are sometimes used to obtain specific properties needed for a given application. These include compounds with multiple functional groups such as diols or triols, glycol ethers, and alkanol amines as well as heterocyclic compounds such as pine-derived solvents (terpenes), sulfolane (tetrahydrothiophene-1,1-dioxane), and NMP (N-methyl-2-pyrrolidinone). In some embodiments, blends of the above-disclosed solvents may be used to improve the solvent properties for certain applications.

In one embodiment of the counter-current liquid-liquid extraction process of the invention, to a system 1 of the invention, a first liquid feed stream 121 is fed by means of the first inlet 111 and a second liquid feed stream 122 is fed by means of the second inlet 112, liquid-liquid contact occurs between the stream 121 and the stream 122 within the mixer settler sub-system 100 to form a first product stream 141 and a first byproduct stream 142, and the first product stream 141 is removed by means of the first outlet 131, and the first byproduct stream 142 is removed by means of the second outlet 132, the first product stream 141 is fed as a third liquid feed stream 231 to the column 200 by means of the first inlet 221 and a fourth liquid feed stream 232 is fed by means of the second inlet 222, liquid-liquid contact occurs between the stream 231 and the stream 232 within the column 200 to form a second product stream 251 and a second byproduct stream 252, and the second product stream 251 is removed by means of the first outlet 241, and the second byproduct stream 252 is removed by means of the second outlet 242.

It is generally preferred to add a higher density stream to the top portion 150 of the sub-system 100 and to the top portion 202 of the column 200 and a lower density stream to the bottom portion 151 of the sub-system 100 and to the bottom portion 201 of the column 200 in order to take advantage of the density differences and gravity as a driving force for the counter-current flow. Likewise it will generally be preferred to remove the lighter stream (141 or 142) from the top portion 150 and the heavier stream (141 or 142) from the bottom portion 151 of the sub-system 100 and to remove the lighter stream (251 or 252) from the top portion 202 and the heavier stream (251 or 252) from the bottom portion 201 of the column 200. In preferred specific embodiments, the density difference between stream 121 and stream 122 is greater than 5, preferably greater than 15, more preferably greater than 20, and most preferably greater than 30 kg/m$^3$.

Figure 6:
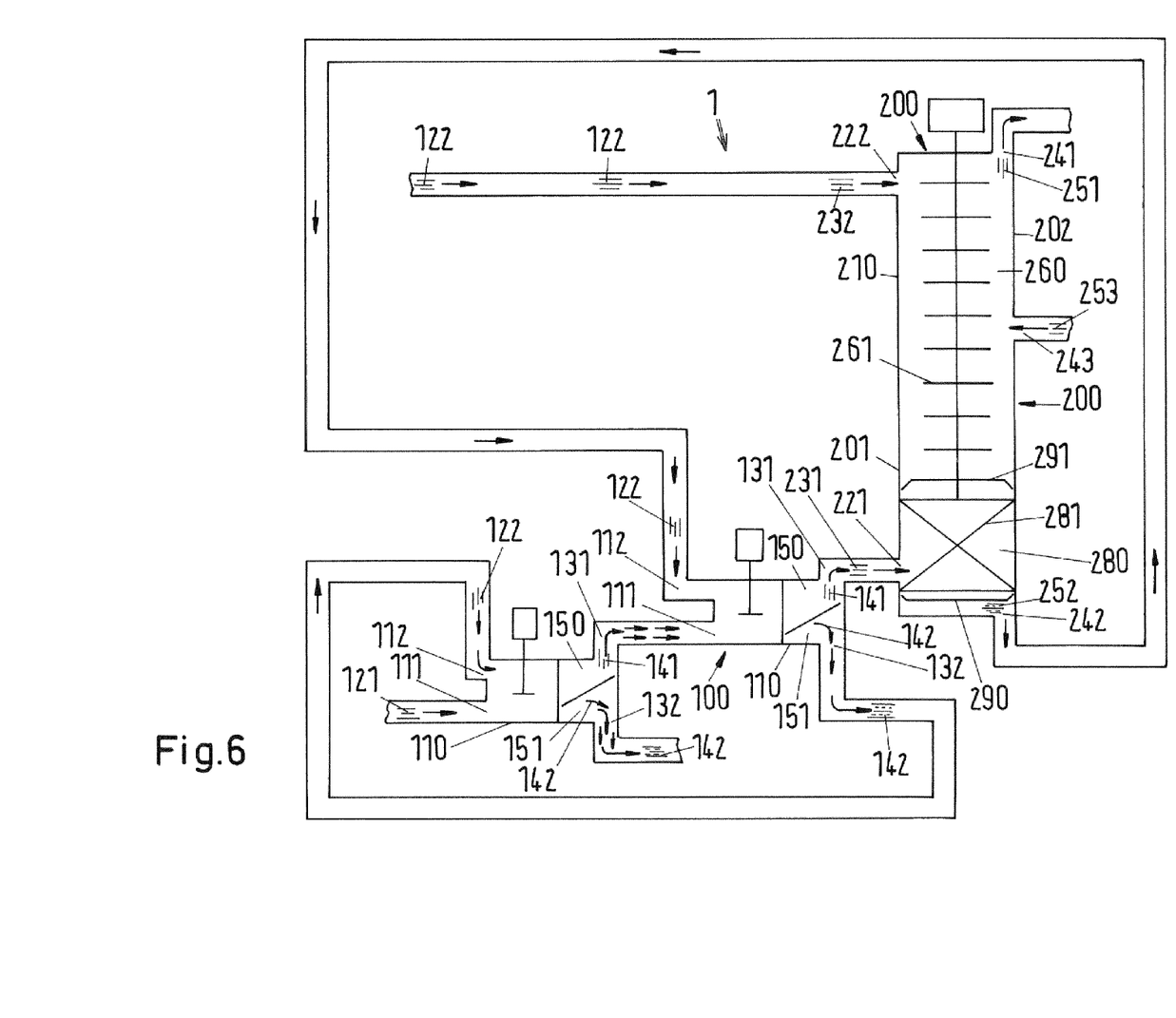
FIG. 6 shows a schematic view of a specifically preferred embodiment of the system of FIG. 5, in which one of the mixer settlers is fed in a recirculation with a preloaded stream from the column (second byproduct stream 252) instead of fresh solvent (second liquid stream 122).

In a preferred embodiment of the process in which the density of the first liquid feed stream 121 is less than the density of the second liquid feed stream 122, wherein the first inlet 221, the static section 280, if present, and the second outlet 242 are all substantially located within a bottom portion 201 of the column 200, and wherein the second inlet 222, the mixing section 260, if present, and the first outlet 241 are all substantially located within a top portion 202 of the column 200, and wherein the first inlet 111 and the second outlet 132 are both substantially located within a bottom portion 151, and wherein the second inlet 112 and the first outlet 131 are both substantially located within a top portion 150 of the sub-system 100. Suitable apparatuses for such a process are the embodiments shown in FIGS. 2, 5 and 6. It is noted that the embodiment in FIG. 5 shows a loop or recirculation in which a preloaded stream (first byproduct stream 142) of one mixer settler 110 is used as a feed stream (second liquid feed stream 122) to another mixer settler 110 in the series. Another embodiment is shown in FIG. 6, in which a loop or recirculation is present such that a preloaded stream (second byproduct stream 252) of the column 200 is used as a feed stream (second liquid feed stream 122) to a mixer settler 110 in the series.

In a more specifically preferred embodiment in which the density of the first liquid feed stream 121 is less than the density of the second liquid feed stream 122, the streams 121, 141, 231 and 251 each comprise one or more organic compounds, preferably two or more organic compounds, most preferably consists essentially of organic compounds and the streams 122, 142, 232 and 252 each comprise water, preferably consists essentially of water. In the present application "organic compound" refers to any member of a large class of chemical compounds whose molecules contain carbon. In some embodiments the organic compound may contain one or more C—H and/or C—C bonds. Some example organic compounds that may be used in the present invention include organic solvents, aromatic compounds, halogenated compounds, polyols, and amides. Organic and aqueous streams often have large-scale differences in their density and other physical properties, and the relative differences in these physical properties change significantly over the system 1 as mass transfer progresses. For example, most organic solvents are significantly less dense than water, however, halogenated solvents such as dichloromethane or chloroform are significantly denser than water. Therefore such streams particularly benefit from the system 1 and process of the invention.

In another more specifically preferred embodiment in which the density of the first liquid feed stream 121 is less than the density of the second liquid feed stream 122, the streams 122 and 232 each comprise a solvent, preferably the same solvent, and the streams 121 and 231 each comprise an oil and an aromatic compound, preferably the same oil and the same aromatic compound, wherein the aromatic compound is extracted from the stream 121 by counter-current contact with stream 122 within the sub-system 100 and the aromatic compound is extracted from the stream 231 by counter-current contact with stream 232 within the column 200 to yield purified oils, wherein the extracted aromatic compound is removed with the solvent as part of the byproduct streams 142 and 252 by means of outlet 132 located within a bottom portion 151 of the sub-system 100 and by means of outlet 242 located within a bottom portion 201 of the column 200, and wherein the purified oil is removed as part of the product streams 141 and 251 by means of outlet 131 located within the top portion 150 of the sub-system 100 and by means of outlet 241 located within the top portion 202 of the column 200. The oil and aromatic compound are not specifically limited. Useful oils include hydrocarbon streams such as the output of a fluid catalytic cracker, white spirit oil, or lubricant oil. Useful aromatics include benzene, toluene, xylene, phenol and polycyclic aromatic compounds such as asphaltic, tar or naptha compounds.

In an alternative preferred embodiment of the process in which the density of the first liquid feed stream 121 is greater than the density of the second liquid feed stream 122, the first inlet 221, the static section 280, if present, and the second outlet 242 are all substantially located within a top portion 202 of the column 200, and wherein the second inlet 222, the mixing section 260, if present, and the first outlet 241 are all substantially located within a bottom portion 201 of the column 200, and wherein the first inlet 111 and the second outlet 132 are both substantially located within a top portion 150, and wherein the second inlet 112 and the first outlet 131 are both substantially located within a bottom portion 151 of the sub-system 100. Suitable apparatuses for such a process are the embodiments shown in FIGS. 1, 3 and 4. It is noted that FIG. 4 shows a loop or recirculation in which a preloaded stream (first byproduct stream 142) of one mixer settler 110 is used as a feed stream (second liquid feed stream 122) to another mixer settler in the series.

In other preferred embodiments of the process, the streams 121 and 122 will have an interfacial tension of greater than 0.5 mN/m, preferably greater than 1, more preferably greater than 2. In other preferred embodiments, the streams 121 and 122 will have viscosities of less than 750 mPas, preferably less than 500, and more preferably less than 250. The use of such interfacial tensions and viscosities will contribute to the efficiency of the extraction process.

In yet another preferred embodiment of the process, a fifth liquid feed stream 253 is added to the column 200 by means of an inlet 243 located between the first inlet 221 and the second inlet 222 of the column 200. In many extractions it will be favorable to add extractants or co-solvents to increase the capacity of the solvent phase for the component(s) to be extracted. In certain specific preferred embodiments, the fifth stream 253 is another solvent, for example, a solvent for washing, stripping or scrubbing. In this manner the extraction process in the column 200 of the system 1 may be effectively combined together with a scrubbing, stripping or washing step within the same column 200.

As discussed earlier for the system 1, in a preferred embodiment of the process, a liquid within the column 200 is pulsed by a pulsing means in order to increase the shear stress on and the dispersion of the liquid.

Yet another aspect of the present invention is the use of the extraction system 1 or the extraction process of the invention in removing aromatic compounds from organic streams, in treating an oil stream of a refinery, or in a liquid-liquid extraction process in which one of the third or fourth liquid feed stream (231 or 232) and one of the second product or byproduct stream (251 or 252) are both substantially located within the top 202 or bottom portion 201 of the column 200 and their viscosity difference is greater than 0.1 cP, or their density difference is less than 60 kg/m$^3$, or their interfacial tension is less than 20 mN/m. In specific embodiments their viscosity difference is greater that 0.5, preferably 1.0 cP, their density difference is less than 25, preferably 20 kg/m$^3$, and their interfacial tension is less than 15, preferably 10 mN/m.

Examples

The following examples are set forth to provide those of ordinary skill in the art with a detailed description of how the counter-current liquid-liquid extraction systems 1, processes, and uses claimed herein are evaluated, and they are not intended to limit the scope of what the inventors regard as their invention.

In these examples, a liquid-liquid extraction system 1 similar to that shown in FIG. 2 was successfully used in a typical application for the liquid-liquid extraction of aromatic compounds from an oil. The column 200 was a Sulzer-Kühni agitated column having a mixing section 260 but no static sections 280.

In these examples, a typical oil and solvent combination as well-known in the art was used. The lower density first and third liquid feed streams 121 and 231 were mineral oil, which contained aromatic compounds detectable by ASTM method IP346. The second and fourth liquid feed streams 122 and 232 were an organic solvent NMP, which was of higher density and fed to the column 200 using a second inlet 222 located within the top portion 202 of the column 200. The mineral oil has a density less than that of NMP, and it was fed to the bottom portion 201 of the column 200 using first inlet 221.

In a comparative trial, the extraction process was applied in a Sulzer-Kühni agitated column 200 having a mixing section 260 but no static sections 280 and without the mixer settler sub-system 100, and it was unfortunately not possible to operate the agitated column 200 with stable hydrodynamic conditions.

During the process the mineral oil was contacted with the organic solvent to remove the aromatic components from the feed oil. The denser loaded solvent, the so called extract, left the bottom portion 201 of the column 200 as a second byproduct stream 252 by means of the second outlet 242, and the purified oil, the so called raffinate, left the top portion 202 of the column 200 as a second product stream 251 by means of the first outlet 241. In this case the density difference of the feed mineral oil and the loaded solvent (extract) was very low, which was one key challenge for operating the extraction column 200.

In particular the low density difference (e.g. less than 25 kg/m3) of the two phases, namely the feed mineral oil and loaded solvent (extract), in the bottom portion 201 of the agitated column 200 made the operation extremely instable. Thus the driving force for the droplet motion was low resulting in a low settling velocity of the dispersed phase. The residence time of the two phase liquid dispersion required for a sufficient phase separation was too long to be handled in any column type extractor with an economical feasible size. Furthermore, a strong initial mass transfer between the two liquid phases led to an instable droplet interface which increased the hydrodynamic problems of the operation.

In a second working trial, the above described extraction system 1 comprising a mixer settler sub-system 100 and a column 200 having a mixing section 260 but no static sections 280, similar to that shown in FIG. 2 (except for the lack of a static section 280), was use to carry out the extraction process. The higher density second liquid feed stream 122 (organic solvent NMP) was fed to the sub-system 100 by the second inlet 112 located within a top portion 150. The lower density first liquid feed stream 121 (mineral oil) was fed to the sub-system 100 by the first inlet 111 located within a bottom portion 151. The bottom portion 201 of the column 200, in which the low density difference between the oil and loaded solvent (extract) was observed to lead to stability problems, was in fluid communication with the mixer settler sub-system 100 to cope with the challenging hydrodynamic conditions there. In particular, the first outlet 131 located within a top portion 150 of the mixer settler sub-system 100 was in fluid communication with the first inlet 221 substantially located within a bottom portion 201 of the column 200. The loaded solvent (extract) left the sub-system 100 as the first byproduct stream 142 by means of the second outlet 132 located within a bottom portion 151.

In order to provide a high separation performance and thus a high purity and quality of the raffinate, the upper part of the column 200 was installed as an agitated column (mixing section 260 with agitation means 261).

By this combination, adequate mass transfer efficiency without a tendency to form emulsions was achieved in this system involving high mass transfer and significant changes in physical properties during the extraction process. In addition, the required raffinate purity was achieved, and no issues with emulsion formation or entrainment were observed during the stable operation of this extraction system 1 as shown in FIG. 2 (but without the static section) in the extraction of the aromatic compounds from the mineral oil using NMP as solvent.

The mixer settler sub-system 100 provided a long residence time upstream of the extraction column 200. In particular, it is noted that even longer residence times could be readily achieved by connecting two more mixer settlers 110 in series, if desired. In this sub-system the feed mineral oil (first feed stream 121) was contacted with NMP solvent (second feed stream 122) and mixed in the mixing section of the equipment. Subsequent the two phase liquid dispersion was allowed to split into two distinct liquid phases in the settling section. The strong mass transfer took place in the mixing section and the long residence time in the settler 110 enabled a good phase separation so that the denser loaded solvent, the so called extract, left the bottom portion 201 of the sub-system 100 as a first byproduct stream 142 by means of the second outlet 132 and the pre-treated (extracted) mineral oil left the top portion 150 of the sub-system 100 as a first product stream 141 by means of the first outlet 131.

The thus pre-treated oil was successfully processed in an extraction column downstream of the mixer settler which was not possible without the mixer-settler step.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A liquid-liquid extraction system adapted for the flow of two or more liquids therein comprising:
    (i) a mixer settler sub-system comprising:
    one or more mixer settlers connected in series,
    a first inlet for a first liquid feed stream,
    a second inlet for a second liquid feed stream,
    a first outlet for a first product stream,
    a second outlet for a first byproduct stream,
    (ii) a counter-current liquid-liquid extraction column and comprising within one common vessel:
    a first inlet for a third liquid feed stream,
    a second inlet for a fourth liquid feed stream,
    a first outlet for a second product stream,
    a second outlet for a second byproduct stream, both a mixing section comprising an agitation means and a static section comprising an internal, and optionally a collector and/or a distributor,
wherein the first outlet of the mixer settler sub-system is in fluid communication with the first inlet of the counter-current liquid-liquid extraction column,
wherein the second inlet of the mixer settler sub-system is in fluid communication with the second inlet of the counter-current liquid-liquid extraction column,
wherein either:
(a) the system is for the separation of a first liquid feed stream that has a lower density than a second liquid feed stream,
wherein the first inlet of the counter-current liquid-liquid extraction column, the static section and the second outlet of the counter-current liquid-liquid extraction column are all located within a bottom portion of the column, and wherein the second inlet of the counter-current liquid-liquid extraction column, the mixing section, and the first outlet of the counter-current liquid-liquid extraction column are all located within a top portion of the counter-current liquid-liquid extraction column,
and wherein the first inlet of the mixer settler sub-system and the second outlet of the mixer settler sub-system are both located within a bottom portion, and wherein the second inlet of the mixer settler sub-system and the first outlet of the mixer settler sub-system are both located within a top portion of the of the mixer settler sub-system,
or;
(b) the system is for the separation of a first liquid feed stream that has a higher density than a second liquid feed stream,
wherein the first inlet of the counter-current liquid-liquid extraction column, the static section and the second outlet of the counter-current liquid-liquid extraction column are all located within a top portion of the counter-current liquid-liquid extraction column, and wherein the second inlet of the counter-current liquid-liquid extraction column, the mixing section, and the first outlet of the counter-current liquid-liquid extraction column are all located within a bottom portion of the counter-current liquid-liquid extraction column,
and wherein the first inlet of the mixer settler sub-system and the second outlet of the mixer settler sub-system are both located within a top portion, and wherein the second inlet of the mixer settler sub-system and the first outlet of the mixer settler sub-system are both located within a bottom portion of the mixer settler sub-system.

2. The system of claim 1, wherein the mixer settler sub-system contains only two mixer settlers connected in series.

3. The system of claim 1, wherein the internal of the counter-current liquid-liquid extraction comprises trays, a random packing, a structured packing, a combination thereof.

4. The system of claim 1, wherein the counter-current liquid-liquid extraction column additionally comprises a third inlet located between the first inlet and the second inlet and the third inlet is provided for the addition of a fifth liquid feed stream.

5. A method of using the apparatus of claim 1, comprising the steps of providing the apparatus of claim 1 and using it in removing aromatic compounds from an organic stream.

6. A method of using the apparatus of claim 1, comprising the steps of providing the apparatus of claim 1 and using it in treating an oil stream of a refinery.

7. A method of using the apparatus of claim 1, comprising the steps of providing the apparatus of claim 1 and using it in a liquid-liquid extraction process in which one of the third or fourth liquid feed stream and one of the second product stream or the second byproduct stream are both located within the top or bottom portion of the column and their viscosity difference is greater than 0.1 cP, or their density difference is less than 60 kg/m$^3$, or their interfacial tension is less than 20 mN/m.

8. A counter-current liquid-liquid extraction process comprising providing a liquid-liquid extraction system adapted for the flow of two or more liquids therein comprising:
(i) a mixer settler sub-system comprising:
one or more mixer settlers connected in series,
a first inlet for a first liquid feed stream,
a second inlet for a second liquid feed stream,
a first outlet for a first product stream,
a second outlet for a first byproduct stream,
(ii) a counter-current liquid-liquid extraction column and comprising within one common vessel:
a first inlet for a third liquid feed stream,
a second inlet for a fourth liquid feed stream,
a first outlet for a second product stream,
a second outlet for a second byproduct stream,
a mixing section comprising an agitation means, or a static section comprising an internal, or both a mixing section comprising an agitation means and a static section comprising an internal,
wherein the first outlet of the mixer settler sub-system is in fluid communication with the first inlet of the counter-current liquid-liquid extraction column,
wherein the second inlet of the mixer settler sub-system is in fluid communication with the second inlet of the counter-current liquid-liquid extraction column,
wherein to the liquid-liquid extraction system,
the first liquid feed stream is fed by means of the first inlet of the mixer settler sub-system and the second liquid feed stream is fed by means of the second inlet of the mixer settler sub-system,
liquid-liquid contact occurs between the stream and the stream within the mixer settler sub-system to form the first product stream and the first byproduct stream,
and the first product stream is removed by means of the first outlet of the mixer settler sub-system, and the first byproduct stream is removed by means of the second outlet of the mixer settler sub-system,
the first product stream is fed as a third liquid feed stream to the counter-current liquid-liquid extraction column by means of the first inlet of the counter-current liquid-liquid extraction column and a fourth liquid feed stream is fed by means of the second inlet of the counter-current liquid-liquid extraction column,
liquid-liquid contact occurs between the third liquid feed stream and the stream within the counter-current liquid-liquid extraction column to form the second product stream and the second byproduct stream,
and the second product stream is removed by means of the first outlet of the counter-current liquid-liquid extraction column, and the second byproduct stream is removed by means of the second outlet of the counter-current liquid-liquid extraction column, wherein the second liquid feed stream to the mixer settler sub-system is in fluid communication with the fourth liquid feed stream to the counter-current liquid-liquid extraction column.

9. The process of claim 8, wherein the density of the first liquid feed stream is less than the density of the second liquid feed stream, wherein the first inlet of the counter-current liquid-liquid extraction column, the static section, if present, and the second outlet of the counter-current liquid-liquid extraction column are all located within a bottom portion of the counter-current liquid-liquid extraction column, and wherein the second inlet of the counter-current liquid-liquid extraction column, the mixing section, if present, and the first outlet of the counter-current liquid-liquid extraction column are all located within a top portion of the counter-current liquid-liquid extraction column, and wherein the first inlet of the mixer settler sub-system and the second outlet of the mixer settler sub-system are both located within a bottom portion, and wherein the second inlet of the mixer settler sub-system and the first outlet of the mixer settler sub-system are both located within a top portion of the sub-system.

10. The process of claim 9, wherein the first liquid feed stream, the first product stream, the third liquid feed stream and the second product stream each comprise one or more organic compounds and the second liquid stream, the first byproduct stream, the fourth liquid feed stream and the second byproduct stream each comprise water.

11. The process of claim 9, wherein the second liquid feed stream and the fourth liquid feed stream each comprise a solvent and the first liquid feed stream and the third liquid feed stream each comprise an oil and an aromatic compound, wherein the aromatic compound is extracted from the first liquid feed stream by counter-current contact with the second liquid feed stream within the mixer settler sub-system and the aromatic compound is extracted from the third liquid feed stream by counter-current contact with the fourth liquid feed stream within the counter-current liquid-liquid extraction column to yield a purified oil, wherein the extracted aromatic compound is removed with the solvent as part of the first byproduct stream and the second byproduct stream by means of the second outlet of the mixer settler sub-system located within a bottom portion of the mixer settler sub-system and by means of the second outlet located within a bottom portion of the counter-current liquid-liquid extraction column, and wherein the purified oil is removed as part of the first product stream and the second product stream by means of the first outlet of the mixer settler sub-system located within the top portion of the mixer settler sub-system and by means of the first outlet of the counter-current liquid-liquid extraction column located within the top portion of the counter-current liquid-liquid extraction column.

12. The process of claim 8, wherein the density of the first liquid feed stream is greater than the density of the second liquid feed stream, wherein the first inlet of the counter-current liquid-liquid extraction column, the static section, if present, and the second outlet of the counter-current liquid-liquid extraction column are all located within a top portion of the counter-current liquid-liquid extraction column, and wherein the second inlet of the counter-current liquid-liquid extraction column, the mixing section, if present, and the first outlet of the counter-current liquid-liquid extraction column are all located within a bottom portion of the counter-current liquid-liquid extraction column, and wherein the first inlet of the mixer settler sub-system and the second outlet of the mixer settler sub-system are both located within a top portion, and wherein the second inlet of the mixer settler sub-system and the first outlet of the mixer settler sub-system are both located within a bottom portion of the mixer settler sub-system.

13. The process of claim 12, wherein the second liquid stream, first byproduct stream, the fourth liquid feed stream and the second byproduct stream each comprise one or more organic compounds and the first liquid feed stream, the first product stream, the third liquid feed stream and the second product stream each comprise water.

14. The process of claim 8, wherein a fifth liquid feed stream is added to the counter-current liquid-liquid extraction column by means of an inlet located between the first inlet and the second inlet of the counter-current liquid-liquid extraction column.

15. The process of claim 8, wherein one of each of the pairs of streams comprising the first liquid feed stream and the second liquid stream, the second liquid stream and the first byproduct stream, the third liquid feed stream and the fourth liquid feed stream, and the second product stream and the second byproduct stream comprises one or more organic compounds, and the other stream in each of the pairs comprises water.

* * * * *